UNITED STATES PATENT OFFICE.

YATARO TANAKA, OF OSAKA, JAPAN, ASSIGNOR TO THE NANIWA GREASE KABU-SHIKI-KAISHA, OF OSAKA, JAPAN.

TRANSFORMER-GREASE.

1,360,153.  Specification of Letters Patent.  Patented Nov. 23, 1920.

No Drawing.  Application filed June 27, 1919. Serial No. 307,174.

*To all whom it may concern:*

Be it known that I, YATARO TANAKA, a subject of the Emperor of Japan, and resident of the city of Osaka, in the Prefecture of Osaka and Empire of Japan, have invented a new and useful Transformer-Grease, of which the following is a specification.

The object of my invention is the production of a semi-solid transformer grease to be applied to transformers and similar electrical devices for lubricating the same efficiently.

My said grease consists of a mixture of a refined mineral oil, an oxidized oil compounded with resinous and bituminous substances, and refined paraffin.

In preparing the grease I prefer to employ the following method, though the manner of preparation and the proportions of the ingredients may be varied, without deviating from the spirit of my invention, to meet various requirements which may arise:

One part of a pine-root oil is added to one thousand parts of a mineral oil, and the mixture is heated while shaking, and then set to cool. A proper amount of sulfuric acid is then added to said mixture, and the resulting mixture is shaken vigorously to bring the sulfuric acid into close contact with the oil and thus to cause the unsaturated hydrocarbon and other impurities to combine with the sulfuric acid, and the same is left to settle. After separating and removing sulfonated products of tar which may be formed, the product is shaken again while adding solution of sodium silicate thereto to neutralize any remaining sulfuric acid, and the same is left to settle again, thus removing the sulfuric acid and at the same time causing small particles of insoluble substances present in the oil in suspension to collect by themselves by means of the silicic acid precipitated then. Thus the mineral oil is cleaned and refined by separating such impurities.

By a separate operation, hemp-seed oil or some other non-drying vegetable oil is heated to from one hundred and twenty-five to two hundred and fifty degrees centigrade and oxidized by passing pure air therethrough, till it becomes viscous and nearly coagulates at an ordinary temperature. To one hundred parts of this oxidized oil, fifty parts of colophony, ten parts of oil of turpentine, two and a half parts of carbon tetrachlorid, ten parts of copal gum, and fifteen parts of bitumen are added, and these ingredients are mixed uniformly by heating.

Sixty parts of said refined mineral oil are heated to one hundred degrees centigrade, and to this twenty-five parts of solid grease formed by adding colophony and some other resins and the like to the oxidized oil is added and thirty parts of refined paraffin is mixed thereto, and the mixture is shaken and compounded till it becomes homogeneous, and later it is filtered by keeping warm to remove any impurities which may be present therein carefully.

In my invention, pine-root oil is first added to mineral oil, and then sulfuric acid is mixed therewith, to facilitate harmonizing of the oil and sulfuric acid and brings them into close contact, and, since sodium silicate is employed afterward as a neutralizing agent, the mineral oil is refined in an ideal manner. An oil of turpentine and carbon tetrachlorid are added to the oxidized oil for the sole purpose of closely and uniformly combining the resinous substances and oxidized oil.

My said grease can resist high voltage or electric pressure, does not deteriorate in use or during storage, retains any dirt or the like which happens to fall thereon on the surface and does not allow it to spread therethrough and so does not lose its normal resistance to electrical pressure, makes it possible to foretell any possible danger from excessive voltage or electrical pressure by being fused thereby, has a comparatively small difference in resistance to pressure when in a solid state and in a fused condition, and is convenient for transportation, packing and other handling, and, as a whole, possesses in a high degree all the desired properties of a transformer grease.

Having thus fully described my invention, what I claim as new and desire to secure by Letters Patent is:

1. A transformer grease consisting of a combination of uniformly mixed refined mineral oil, viscous coagulating oxidized non-drying vegetable oil, colophony, turpentine, carbon tetrachlorid, copal gum and bitumen.

2. A transformer grease formed by combining a cleaned refined mineral oil with an oxidized non-drying vegetable oil and adding thereto and mixing therewith colophony, turpentine, carbon tetrachlorid, copal gum and bitumen.

3. A process of producing a transformer grease which consists in combining one part of pine root oil with one thousand parts of a mineral oil by heating and agitating them; then cooling said mixture and adding thereto sulfuric acid; then vigorously agitating the resulting mixture; then allowing the mixture to settle and removing therefrom any resulting sulfonated products of tar; then adding an agent which neutralizes sulfuric acid and causes small particles of insoluble substances to collect by themselves; then removing such substances and adding an agent for closely and uniformly combining the resinous substances and oxidized oils.

4. A process of producing a transformer grease which consists in combining one part of pine root oil with one thousand parts of a mineral oil by heating and agitating them; then cooling said mixture and adding thereto sulfuric acid; then vigorously agitating the resulting mixture; then allowing the mixture to settle and removing therefrom any resulting sulfonated products of tar; then adding sodium silicate and allowing the mixture to settle; then removing from the mixture the collected insoluble substances and adding to the resultant compound a mixture composed of a non-drying vegetable oil which has been heated and oxidized and one hundred parts thereof combined with fifty parts of colophony, ten parts of oil of turpentine, two and one half of carbon tetrachlorid, ten parts of copal gum, and fifteen parts of bitumen, said ingredients having been uniformly mixed by heating.

In testimony whereof I affix my signature hereto.

TARO TANAKA.